United States Patent

Thomire et al.

[11] Patent Number: 6,044,950
[45] Date of Patent: Apr. 4, 2000

[54] HYDRAULIC CLUTCH CONTROL ACTUATOR IN PARTICULAR OF MOTOR VEHICLE

[75] Inventors: Sylvain Thomire, Levallois; Frédéric Rey, Paris, both of France

[73] Assignee: Valeo, Paris, France

[21] Appl. No.: 09/068,939

[22] PCT Filed: Sep. 30, 1997

[86] PCT No.: PCT/FR97/01725

§ 371 Date: May 21, 1998

§ 102(e) Date: May 21, 1998

[87] PCT Pub. No.: WO98/14713

PCT Pub. Date: Apr. 9, 1998

[30] Foreign Application Priority Data

Sep. 30, 1996 [FR] France .................................. 96 11888

[51] Int. Cl.[7] .............................. F16D 19/00; F16D 25/08
[52] U.S. Cl. ..................... 192/85 CA; 192/59; 192/91 A
[58] Field of Search ............................ 192/85 CA, 91 A, 192/59

[56] References Cited

U.S. PATENT DOCUMENTS

| 4,561,531 | 12/1985 | Young et al. ........................ 192/85 CA |
| 5,211,099 | 5/1993 | Grosspietsch et al. ............... 192/91 A |
| 5,547,058 | 8/1996 | Parzefall et al. .................... 192/85 CA |
| 5,620,076 | 4/1997 | Voit et al. .............................. 192/91 A |

Primary Examiner—Rodney H. Bonck
Assistant Examiner—Tisha D. Waddell
Attorney, Agent, or Firm—Liniak, Berenato, Longacre & White

[57] ABSTRACT

A receiver comprises an external body (5) having a thrust face (166) and a centring surface (167), and a concentric internal tube (6) with a flange (61) in contact with the thrust face (166), the centring surface (167) being part of a portion (153) of increased thickness which has a shoulder (195) formed by deformation so as to trap and grip, between the latter and the thrust face (166), an intermediate member (95) and the outer periphery of the flange (61).

11 Claims, 3 Drawing Sheets

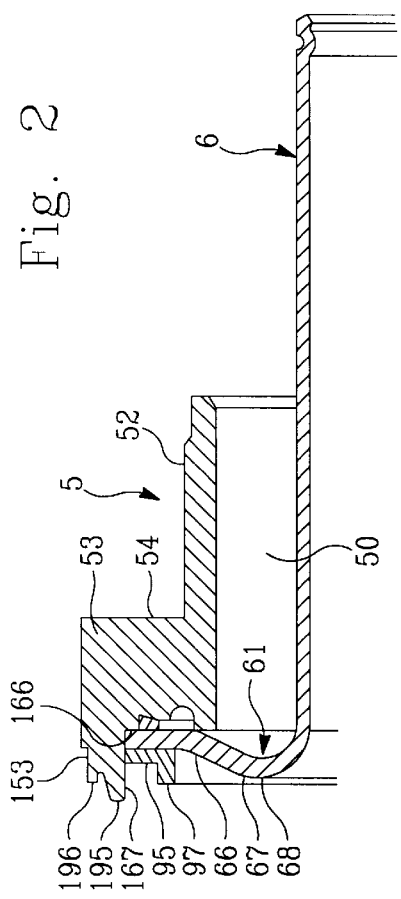
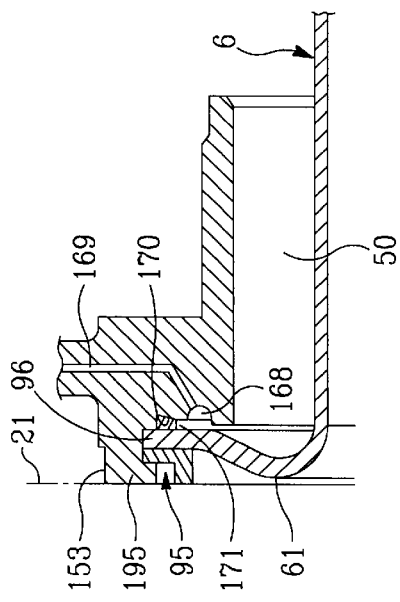
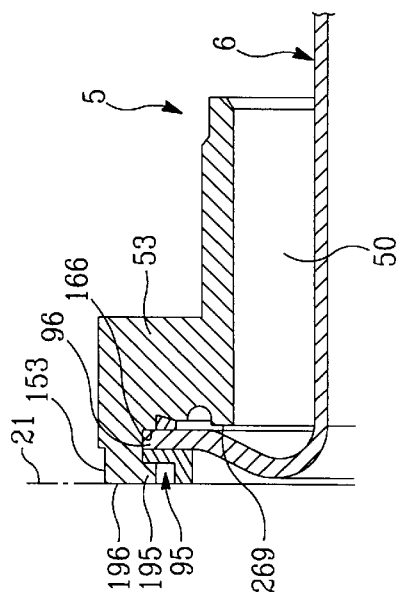

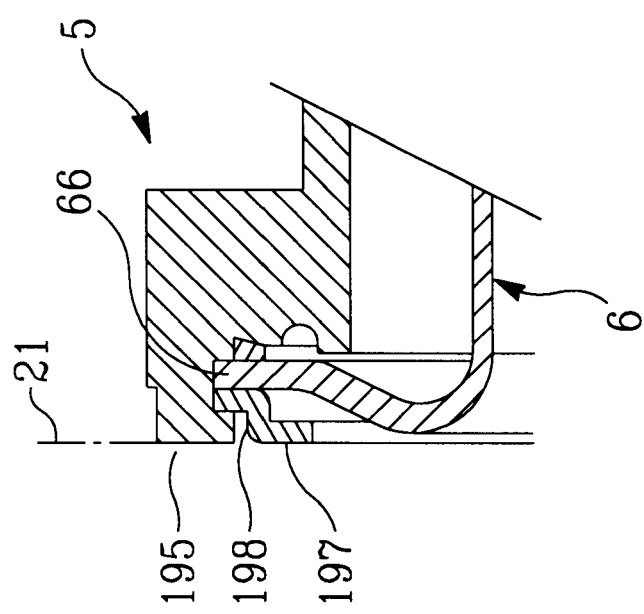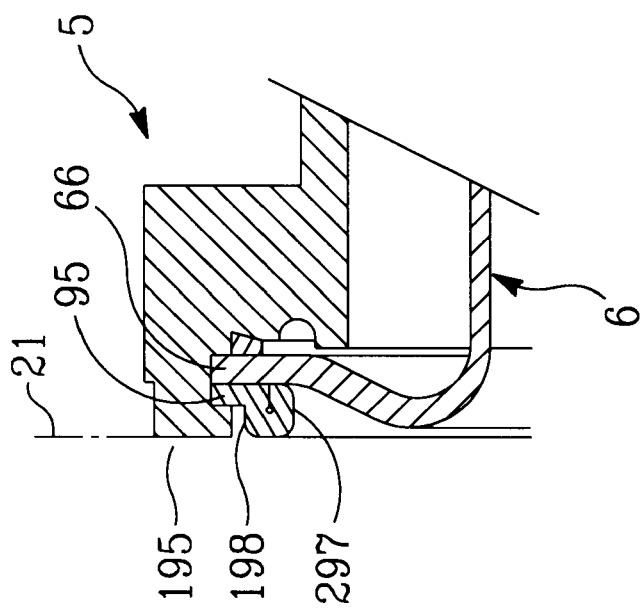

HYDRAULIC CLUTCH CONTROL ACTUATOR IN PARTICULAR OF MOTOR VEHICLE

BACKGROUND OF THE INVENTION

1. Field of the Invention

The present invention relates to hydraulic control systems for clutches, especially for motor vehicles.

More particularly it relates to the receiver for such a control system.

2. Description of the Related Art

As is known, the receiver, which is also referred to as an actuator, of such a control system comprises two parts in cylinder-and-piston relationship, namely a first part or fixed part, for fastening the control means on a fixed structure such as the casing of a gearbox, and a second part, or moving part, which typically consists of a piston sliding axially and mounted inside a blind cavity which is defined by the fixed part, the latter being hollow.

This cavity is arranged to be pressurised and to be depressurised.

In this way, with the piston, a variable volume chamber is defined.

For this purpose, the fixed part includes a feed inlet connected to the cavity.

The control fluid may be gaseous, such as compressed air, or liquid, for example oil, the control system being generally referred to as a hydraulic control system.

The feed inlet is connected to the emitter of the control system through a duct. This emitter is actuated by the clutch pedal, or, in a known way, by an actuator which has for example an electric motor actuating the piston of the emitter through an interposed mechanical transmission.

The electric motor is governed by a computer which receives information from sensors, which are associated in particular with the gear change lever and with the driving and driven shafts, so as to measure the speed of rotation of these latter.

The fixed part of the receiver includes for example ears for fastening it on a fixed part such as the casing of the gearbox.

For more detail, reference should be made to the document WO96/24781.

In another version, the fixed part comprises at least one external body, a sole plate arranged to be fixed on the casing of the gearbox, and bayonet mounting means interposed between the external body and the sole plate, which is preferably of metal.

Thus, the external body may be standardised, while the sole plate serves as an adaptor and is configured according to the application, and more precisely as a function of the form of the fixed part on which it is fastened.

Such an assembly is described for example in the document FR-96 02591 filed on Feb. 26, 1996.

In those two documents, the cavity is defined by an external body of mouldable material, and by a concentric internal tube.

The components are arranged coaxially and concentrically.

The tube is of metal and constitutes a support and guiding member for the piston that actuates the clutch release bearing of the clutch.

For the best explanation, reference should be made to FIG. 1, which corresponds to FIG. 2 in the document WO-A-96/24781.

Thus, shown at 1 is a conventional clutch of the push-to-release type, in which the declutching device consists of the fingers of a diaphragm 13, on the inner ends of which there acts a clutch release bearing 3 which, in this case, is part of the receiver 2 of the hydraulic clutch control system.

In another version, the declutching device of the clutch may consist of declutching levers acting on springs which are mounted between the cover plate 14 and the pressure plate 12 of the clutch. Auxiliary springs may be provided. These springs may act in series, or in parallel with the diaphragm. A series arrangement is described for example in the document FR-97 11058 filed on Sep. 5, 1997, with the clutch being then able to be equipped with a wear compensating device to compensate for wear in the friction liners 16 of the disc 11.

In this Figure, by way of example, the diaphragm 13 is mounted for pivoting movement on the cover plate by means of short posts 20.

The diaphragm 13 acts on the pressure plate 12 through its Belleville ring portion, so as to grip the friction liners 16 of the friction wheel 11 between the pressure plate 12 and the reaction plate 10 of the clutch.

In the context of an application to a motor vehicle, the torque is thus transmitted from the crankshaft (not shown) of the engine of the vehicle, on which the reaction plate 10 is secured by means of screws, to the input shaft of the gearbox (not shown) on which the internally splined hub 17 of the friction wheel 11 is mounted.

The clutch is thus engaged, with the piston 4 being retracted by its maximum amount in the cavity 50 defined by the fixed body 5,6, which in this case is in two coaxial and concentric parts, namely the external body 5, of a casting material which is aluminium based for example, and the metallic internal tube 6 which is surrounded by the body 5.

The feed inlet is shown at 56 and is formed by moulding with the body 5, which in this case is of tubular form, while the duct coming from the emitter of the hydraulic control system is shown at 58.

This feed inlet 56 has an internal channel which is open in the base of the cavity 50, the piston 4 having at its rear end a seal 45 for sealing the cavity 50. The volume of the control chamber is then at a minimum value.

When the cavity 50 is pressurised with a control fluid from the above mentioned emitter via the duct 58 and the inlet 56, the piston 4 is caused to be displaced towards the left in FIG. 1, so that the volume of the control chamber is increased.

The diaphragm 13 pivots because of the short posts 20, so that its gripping action on the pressure plate 12 diminishes progressively.

At the end of a displacement C, or declutching travel, of the piston 4 and of the clutch release bearing 3, which in this case is carried by the piston 4, the diaphragm 13 no longer exerts any force on the pressure plate 12. Tangential tongues (not shown) then return the pressure plate towards the base of the cover plate 14, which in the present case is secured by means of screws, not shown, on the reaction plate 10.

The clutch is now disengaged; an axial clearance (not shown) exists between the friction liners 16 and the pressure plate 12. The torque is then no longer transmitted from the driving shaft (the crankshaft of the engine) to the driven shaft (the input shaft of the gearbox).

It will be recalled that the tangential tongues mentioned above provide coupling in rotation, with axial mobility, between the cover plate 14 and the pressure plate 12.

The volume of the control chamber is now at a maximum value, with the piston 4 occupying a deployed position (as in the upper part of FIG. 1).

When the cavity 50 is depressurised, the piston 4 returns, under the action of the diaphragm 13, to its initial retracted position (as in the lower part of FIG. 1).

The clutch release bearing defines the actuating element which acts in a thrust mode on the declutching device (i.e the diaphragm 13) of the clutch, and here it comprises a ball bearing, the rotating ring of which is in contact, permanently in this case, with the diaphragm 13 through a preloading spring 7 acting between the body 5 and the piston 4.

The spring 7 is protected by a bellows 8 surrounding the spring 7.

As can be seen, the internal tube 6 is longer in the axial dimension than the external body 5, and is of low thickness, which reduces overall radial size.

The body 5 has a thin tubular front portion for guiding the spring 7, and a thicker rear portion in the form of a collar.

The inlet 56 is connected to the collar portion, the front face of which serves as an abutment for the spring 7, the other end of which is in engagement on a transverse flange formed on the piston 4 at its front end. This transverse flange serves as the abutment for the nonrotating ring of the bearing 3, the bellows being attached to the said ring and gripped by a piece in contact with the front transverse face of the collar portion of the body 5.

A guide sleeve 9 carried by the tube 6 guides the tubular piston 4, as does the axially oriented cavity 50.

The presence of the sleeve 9 is of course not obligatory, as can be seen in the above mentioned document FR-96 02571, and the piston 4 can be of plastics material or include rings for its sliding motion along the tube 6.

In all cases, the tube 6 preferably carries a stop abutment, such as the sleeve 9 or a toroidal ring, for limiting the displacement of the piston 4.

It is possible to construct a sub-assembly in advance, because the tube has a generally transversely oriented flange at its rear end. This flange, which is annular, closes off the cavity 50 and defines the base of the latter.

The flange is in contact with a transverse abutment surface formed in the rear face of the collar portion of the external body 5 surrounding the internal tube 6.

A sealing ring is arranged at this level so as to seal the cavity 50.

The transverse abutment face defines a recess (a groove) at the rear of the body 5.

Thus, before the receiver 2 is mounted on the casing 21 of the gearbox, the spring 7 holds the flange of the metallic tube 6 in contact with the external body 5, which has ears, one of which can be seen at 51 in the lower part of FIG. 1, for fastening it to the casing of the gearbox, for example by means of screws.

The receiver 2 in this case is of the concentric type, because the input shaft of the gearbox passes through the internal tube 6. The recess is also defined by a surface for centring the flange of the tube, with the said part centring the said flange.

After the body 5 has been fixed on the casing 21, the flange of the internal tube 6 is clamped between the casing 21 and the rear face of the collar portion of the external body.

This arrangement makes it necessary to configure the casing 21 in such a way that the latter offers an abutment face to the flange of the internal tube 6.

Having regard to the form of the casing, this is not always possible.

In addition, it involves the need to respect precise tolerances between the casing and the rear of the external body, so that the flange will be properly clamped.

These tolerances take account of the fact that the external body is fixed on the casing either directly, for example by means of ears, or indirectly, with the aid of a sole plate for example.

An object of the present invention is to overcome these drawbacks in a simple and inexpensive way, but with strong retention of the flange in spite of variations in pressure in the cavity.

SUMMARY OF THE INVENTION

According to the invention, a receiver of the type described above, in which the external body is recessed at its rear end whereby to mount the flange of the internal tube and to define a transverse abutment face and an axially oriented annular centring surface, which is formed in an axially oriented portion of increased thickness of the body, radially outside its transverse abutment face, is characterised in that the portion of increased thickness is extended axially for mounting an intermediate member, in that the intermediate member is in contact with the face of the said flange which faces away from the transverse thrust face of the external body, and in that the portion of increased thickness is deformed so as to define a transverse abutment shoulder which makes contact with the radially outermost portion of the intermediate member so as to trap and grip the flange and the intermediate member between the transverse rear thrust face of the external body and the said shoulder.

Thanks to the invention, the flange is assembled by seaming to the external body with the intermediate member being interposed, thus increasing the bending inertia of the system consisting of the external body and the internal tube, due to the fact that the intermediate member projects radially inwardly with respect to the abutment shoulder, and this without any undue increase in size, especially in the axial sense.

The portion of increased thickness preferably includes a weakened portion to enable the seaming operation to be carried out.

This may for example consist of an axially oriented projecting annular ring, which is upset axially so as to achieve seaming.

This intermediate member, applied to the flange, thus limits deformations of the latter, and also deformations in the external body.

The intermediate member is annular in form.

All of these arrangements are of benefit because this enables the output of the control system to be increased by increasing its rigidity in the region of the base of the cavity.

In addition, stresses are limited in the region of the outer periphery of the flange of the internal tube and in the region of the portion of the external body with increased thickness, which preferably has a surface for centring the flange and the intermediate member.

Thanks to the intermediate member, the seam has good mechanical strength and is highly resistant to variations in pressure within the cavity, while the flange is backed up by the intermediate member so that the useful life of the receiver is prolonged, and the receiver is more reliable. The flange is thus held firmly.

An annular groove may be formed in the transverse thrust face. This groove is in communication with the internal channel of the feed inlet. Passages are formed in the rear end of the external body for communication with the cavity.

All of this is possible because of the increased mechanical strength in the seam, which also preferably serves to squeeze a sealing ring.

The reduction in internal stresses is favourable to the provision of a bayonet type fitting on a fastening sole plate, with the said body having passages for receiving fastening lugs that project from the sole plate, with relative rotation of the lugs with respect to the passages so as to fasten the body on the sole plate. The passages may thus be put close to the flange.

Thanks to the invention, the flange does not need to be pinched between the casing and the external body, so that manufacturing tolerances that have to be taken into account are easier to achieve, and this leads to a reduction in costs.

The benefit is also obtained of good output of the control system, while having a robust seam and a short overall axial dimension.

The annular intermediate member, which strengthens the flange, preferably includes at least one radially projecting element, radially inwards of the shoulder by which the body is abutted and locked in place.

The projecting element increases the inertia of the intermediate member.

The member may for example have an L-shaped profile.

In another version it may have a T-shaped or S-shaped profile.

Preferably, the said projecting element consists of a portion which is bent back and which increases inertia to a maximum while occupying little space.

More precisely, this arrangement enables the best use to be made of the available space.

The intermediate member is accordingly of angled cross section, in the form of an L, an S, or an L with a bend.

The above mentioned projecting elements increase the rigidity of the intermediate member, which enables deformations of the flange, and deformations of the portion of the external body having increased thickness, to be reduced even further, with similar reduction in stresses.

Having regard to the presence of the intermediate member, the flange is press-formed in the region of its root where it joins the main portion of the tube.

In one embodiment, the tube has at its rear end, and in cross section, a rounded zone joined to an inclined portion which is extended by the seamed transverse portion according to the invention.

In this way the flange, in combination with the presence of the intermediate member, is stiffened by the maximum amount.

The portion of increased thickness serves for centring the flange.

The seal associated with the input shaft of the gearbox can take an appropriate form having regard to the fact that the flange is not in contact with the fixed part.

The following description illustrates the invention with reference to the accompanying drawings.

BRIEF DESCRIPTION OF THE DRAWINGS

FIG. 2 is a view in axial cross section showing part of the external body and the internal tube of the receiver, prior to the seaming operation in accordance with the invention;

FIG. 3 is a view identical to FIG. 2 but after the seaming operation;

FIG. 4 is a partial view similar to FIG. 3 and showing the feed duct for the feed groove in the cavity of the receiver;

FIGS. 5 and 6 are views similar to FIG. 3 for further embodiments.

DETAILED DESCRIPTION OF THE PREFERRED EMBODIMENT

Figure 1:
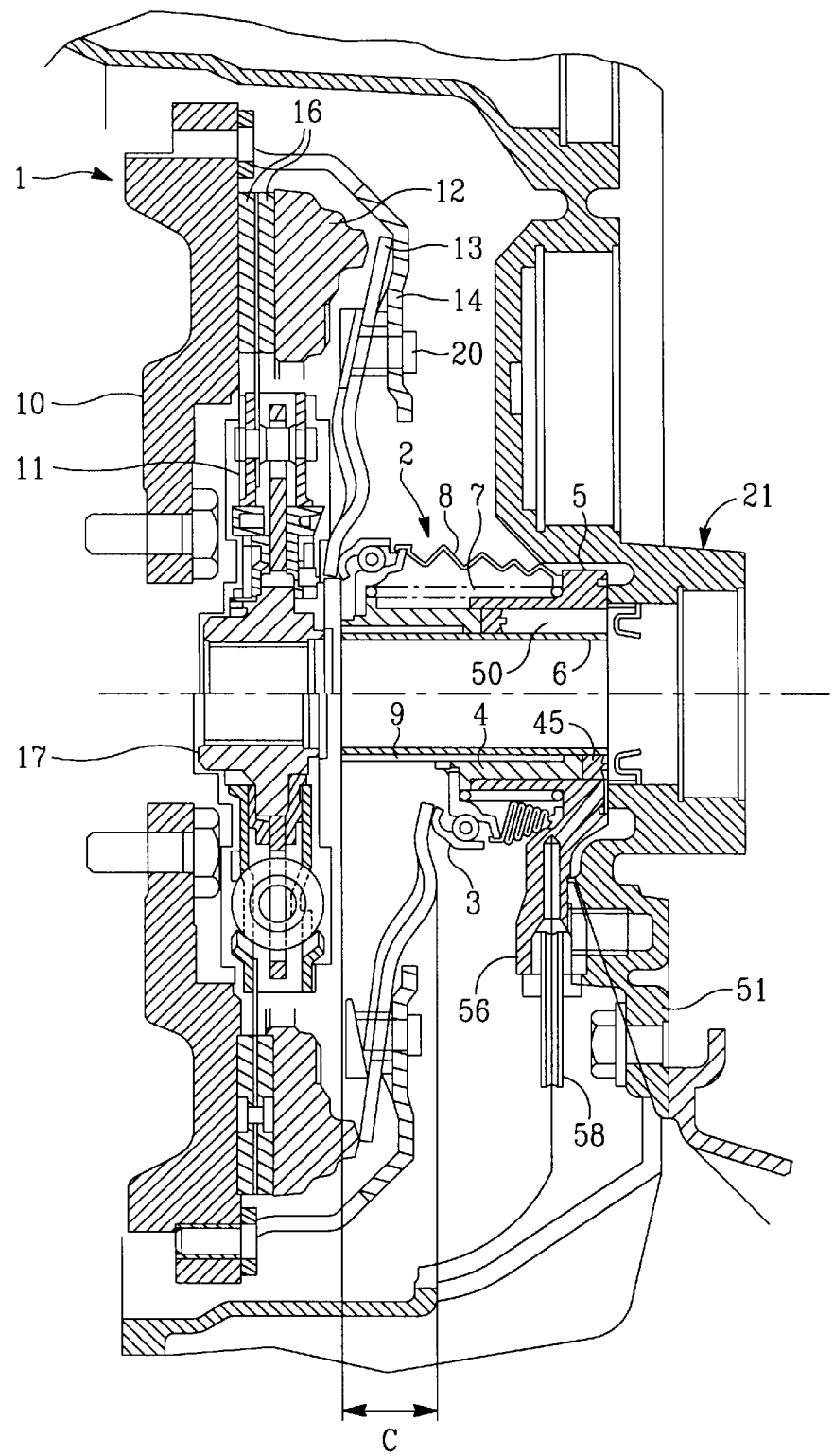
FIG. 1 is a view in axial cross section of a diaphragm clutch and of a hydraulic control unit in the prior art.

In the interests of simplicity, those elements common to the invention and to those in the document WO-A-96/24781 are given the same reference symbols in FIGS. 2 to 6.

In these Figures, the bellows 8, the preloading spring 7 and the piston of FIG. 1 are omitted in the interests of clarity, the important features being the seaming zone between the external body 5, which is generally tubular in form, and the concentric internal tube 6.

The external body 5 has the same form as in FIG. 1, and therefore includes ears, not shown in these Figures, for fastening it to the casing 21 (indicated in outline) of the gearbox.

The body 5 is of casting material, and in this example it is an aluminium based material, and includes a tubular front portion 52 projecting axially with respect to the rear portion 53, which is of greater thickness and which is in the form of a collar portion projecting radially outwards from the front portion 52.

The front face of this collar portion, which serves as an abutment for the preloading spring centred by the front portion 52, can be seen at 54.

The tube 6 and the body 5 are arranged coaxially and concentrically so as to define the annular and axially oriented blind cavity 50. The body 5 surrounds the tube 6.

It is inside this fixed cavity that the piston of FIG. 1 slides, guided by the internal tube 6, which is longer in the axial sense than the body 5, and which has at its end a groove for mounting a toroidal ring (not shown), which constitutes a stop abutment for the piston carrying the clutch release bearing.

The rear end of the collar portion 53, and therefore of the body 5, is cut away to form a recess in the form of a rebate.

The body 5 is accordingly recessed at its rear end so as to define a transverse thrust face 166 and an annular centring surface 167, which extends from the outer periphery of the thrust face 166.

The centring surface 167 is oriented axially and is part of an axially oriented portion 153 of increased thickness.

This portion 153 of increased thickness is in the form of a skirt 153, the inner periphery (the internal bore) of which is constituted by the centring surface 167.

The portion 153 of increased thickness extends radially outward of the thrust face 166.

The internal tube 6 has at its rear end a generally transversely oriented flange 61 which is mounted within the rear recess of the external body 5.

The flange 61 is annular and is in contact through its outer peripheral portion 66, oriented transversely, with the thrust face 166 of the body 5. It is in intimate contact through its outer peripheral edge with the centring surface 167.

According to one feature of the invention, the portion 153 of increased thickness is extended axially for the fitting of an intermediate member 95.

This member 95 is abutted to the flange 61, being in contact with the outer peripheral portion 66 of the latter, and more precisely with the face of the latter which faces away from the transverse thrust face 166.

The portion 153 of increased thickness is deformed (by axial deformation) so as to form a transverse abutment shoulder 195 that makes contact (comes into engagement) with the radially outermost portion 96 of the intermediate member 95, so as to trap and grip the flange 61 and the intermediate member 95 between the rear transverse thrust face 166 of the external body and the said shoulder 195.

The shoulder 195 is offset axially with respect to the thrust face 166, and faces towards the latter.

The internal tube 6 is thus secured by seaming to the metallic external body 5 by virtue of the axially oriented portion 153 of increased thickness.

Thus, with the aid of a tool, the material of the thickened portion 153 is locally upset in plastic flow axially and radially, so as to form the abutment shoulder 195 which constitutes a locking shoulder.

Prior to the seaming operation (FIG. 2), the shoulder 195 is constituted by an axially oriented, axially projecting annular ring portion of the thickened portion 153.

In FIG. 2, this annular ring portion projects axially with respect to a transverse contact surface 196 of the thickened portion 153, radially outside the shoulder 195. This surface 195 is arranged to make contact with the casing 21 (i.e. the fixed part), which is represented only in outline in FIG. 3.

After the seaming operation, the material of the thickened portion 153 of the annular ring portion, which in this example is of divided form, is upset, in plastic flow, radially inwardly so as to form the shoulder 195, which is offset axially with respect to the thrust face 166 and is in facing relationship with the latter.

It will be noted that this operation is easy to carry out, because the front face 54 of the collar portion 53 serves as abutment for an anvil element which is fixed with respect to the axially movable element of the tool that upsets the material to form the shoulder 195. The body 5 is of course of metal, to enable the material to flow and therefore to permit the seaming operation.

The intermediate member 95 is annular in form. It lies radially inwardly of the shoulder 195, and increases the thickness of the flange 61, and more precisely that of the peripheral portion 66 of the flange 61.

This member 95 may consist of a simple ring. It is generally annular in form and is of metal.

In this example, the member 95 has an L-shaped cross section and has at its inner periphery a stiffening ring 97, oriented axially and directed towards the casing 21.

It will be noted that the shoulder 195 and the ring 97 are in a position withdrawn slightly in the axial direction with respect to the casing 21, so as not to interfere with the latter.

The ring 97 constitutes a projecting element which is located radially inwardly of the abutment shoulder 195. This ring may be divided into annular sectors.

The flange 61 has a particular form so as to increase its rigidity in combination with the presence of the metallic intermediate member 95. The outer peripheral portion 66, in the form of a ring, is joined to an inclined annular portion 67 in a direction opposed to the thrust face 166, which is itself joined to a rounded annular zone 68, in this example generally over 90° in cross section. Thus, the portion 67 is frusto-conical in form and the zone 68 is toroidal, since the flange 61 is annular.

The rounded zone 68 is in a position withdrawn slightly with respect to the casing 21 so as not to interfere with the latter.

This zone 68 is joined to the tubular main portion of the internal tube 6.

The intermediate member 95 is in contact with the face of the peripheral portion 66 of the flange 61 that faces away from the transverse thrust face 166.

All of this enables the available space to be occupied to the maximum extent at the rear end of the external body 5, by virtue of the rear rebate in the latter, while giving maximum stiffening to the flange and reducing stresses in the region of the thickened portion 153 of the body 5 and the peripheral portion 66 of the flange 61.

Thus, in operation, the shoulder 195 will not open, because of the intermediate member 95, which is preferably of metal.

This member 95 and the flange 61 are centred by the centring surface 167.

All these arrangements enable the output of the hydraulic control system to be increased, and the transverse thrust face 166 may be formed with an annular feed groove 168 for feeding the cavity 50. This groove 168 is in communication with the duct 169 of the feed inlet. The groove 168 faces towards the portion 66 of the flange 61. It lies radially inward of the projecting element 97 of the intermediate member.

The thrust face 166 lies radially inwards of the peripheral portion 66 of the flange 61, and has a generally transversely oriented relieved portion 269 to permit passage of the control fluid coming from the groove 168. This fluid, which in this example is for example oil, thus flows into the cavity 50, its flow being facilitated by the inclined portion 67 and the rounded zone 68 of the flange 61.

The groove is widened radially outwards so as to define a seating 170 in which a sealing ring 171, lying radially outwards of the groove 168 proper, is fitted.

The sealing ring 171 is squeezed by the peripheral portion 66 of the flange 61.

The thrust face 166 is therefore in contact, in this example, with the flange 61 through an outer peripheral zone of the shoulder 195 which lies radially outside the facing sealing ring 171.

In another version, the thrust face 166 may of course be in internal contact with the outer periphery 66 of the flange 61.

In that case, it is necessary to form grooves, which are for example transverse, in the region of the inner periphery of the thrust face 166, for providing communication of the groove 168 with the cavity 50.

It is of course possible to modify the intermediate member 95, and more precisely the form of the latter, radially inwardly of the shoulder 195.

Thus, in FIG. 5, the intermediate member 95 has at its inner periphery an annular, transversely oriented, projecting element 197 which extends radially inwards.

This projecting element is joined through an axially oriented annular portion 198 to the main portion of the annular intermediate member, which therefore has a generally S-shaped cross section.

This increases the mass, and therefore the inertia, of the intermediate member 95 as compared with that in FIG. 1, while avoiding any contact with the casing 21.

In another version, FIG. 6, the material of the transverse portion 197 in FIG. 5 can be bent over so as to increase inertia and rigidity of the intermediate member 95 even more, its projecting element consisting in this case of a portion 297 which is bent back from the axially oriented annular portion 198.

The bent back portion 197 is in contact with the portion 198.

The shoulder 195 can of course be of continuous annular form, but because of the invention it can be divided into annular sectors due to the presence of the intermediate member 95, which has a stiffening function.

The seaming operation is thus easier to carry out, and is more precise, while giving good axial clamping of the flange 61 and member 95 between the thrust face 166 and the shoulder 195.

This axial clamping is sufficient in all cases to couple the flange 61 and the member 95 together in rotation between the thrust face 166 and the shoulder 195, and therefore the external body 5.

The present invention is of course not limited to the embodiments described.

In particular, the location of the contact surface 196 on the casing depends on the application.

The intermediate member may be T-shaped in cross section.

The projecting element may be of divided form.

Instead of being applied on the casing, the body 5 may be applied on a sole plate carried by the latter.

It will be noted that in FIGS. 5 and 6, the groove lies at least partly at the radial level of the projecting elements.

The centring surface 167 of the thickened portion 153 enables the flange 61 of the internal tube and the intermediate member 95 to be centred while being in intimate contact with the peripheral outer edge of these latter.

In all cases, the thickened portion 153 is weakened locally so that the shoulder 195 can be formed easily and accurately. In this example, this is carried out with the aid, for example, of an axially projecting annular ring separated from the surface 196 by a weakening notch. In the present case the annular ring is preferably divided into sectors.

Other embodiments may be envisaged.

We claim:

1. A hydraulic control receiver for a clutch, comprising two coaxial members (5, 6) arranged concentrically so as to define a blind annular cavity (50) which is arranged to be supplied with a control fluid, one of said members comprising a body (5) recessed at its rear end so as to define a transverse thrust face (166), referred to as a thrust face, and a centring surface (167), while the other one of said members comprises a support and guide tube (6) for a piston (4) mounted for axial sliding movement in said cavity (50), wherein the tube (6) has at its rear end a generally transversely oriented flange (61) in contact with the thrust face (166) and with the centring surface (167), the centring surface being of annular form and oriented axially, and being part of an axially oriented portion (153) of increased thickness extending radially outwardly from the thrust face (166), wherein the portion (153) of increased thickness is extended axially for mounting an intermediate member (95), the intermediate member (95) is in contact with the face of said flange (61) which faces away from the thrust face (166), and the portion (153) of increased thickness is deformed so as to define a transverse abutment shoulder (195) which makes contact with a radially outermost portion (96) of the intermediate member so as to trap and grip the said flange (61) and the intermediate member (95) between the thrust face (166) and the abutment shoulder (195).

2. A receiver according to claim 1, wherein the intermediate member (95) is annular in form and has a projecting element (97, 197, 297) radially inward of the abutment shoulder (195).

3. A receiver according to claim 2, wherein the intermediate member (95) has at its inner periphery an axially oriented annular stiffening ring portion (97), which may be of divided form.

4. A receiver according to claim 2, wherein the intermediate member has a generally S-shaped cross section.

5. A hydraulic control receiver for a clutch, comprising two coaxial members (5, 6) arranged concentrically so as to define a blind annular cavity (50) which is arranged to be supplied with a control fluid, one of said members comprising a body (5) recessed at its rear end so as to define a transverse thrust face (166), referred to as a thrust face, and a centring surface (167), while the other one of said members comprises a support and guide tube (6) for a piston (4) mounted for axial sliding movement in said cavity (50), wherein the tube (6) has at its rear end a generally transversely oriented flange (61) in contact with the thrust face (166) and with the centring surface (167), the centring surface being of annular form and oriented axially, and being part of an axially oriented portion (153) of increased thickness extending radially outwardly from the thrust face (166), wherein the portion (153) of increased thickness is extended axially for mounting an intermediate member (95 the intermediate member (95) is in contact with the face of said flange (61) which faces away from the thrust face (166), and the portion (153) of increased thickness is deformed so as to define a transverse abutment shoulder (195) which makes contact with a radially outermost portion (96) of the intermediate member so as to trap and grip the said flange (61) and the intermediate member (95) between the thrust face (166) and the abutment shoulder (195), wherein the intermediate member (95) is annular in form and has a projecting element radially inward of the abutment shoulder (195) and the intermediate member has a generally S-shaped cross section and the intermediate member has at its inner periphery a transversely oriented annular projecting element (197) directed radially inwardly, and said projecting element is joined to the main part of the intermediate member (95) by an axially oriented annular portion (198).

6. A receiver according to claim 2, wherein the intermediate member has at its inner periphery an axially oriented annular first portion (198) extended by a bent-back portion in contact with the first portion.

7. A receiver according to claim 1, wherein the abutment shoulder (195) lies radially inwards of a transverse contact surface (196) of the body (5), for contact of the body (5) with a casing.

8. A receiver according to claim 1, wherein the flange (61) of the tube (6) has a peripheral portion (66) in the form of a ring joined to a portion (67) which is inclined away from the thrust face (166), and which is itself joined to a rounded annular zone (68), the latter being joined to the main portion of the internal tube (6).

9. A receiver according to claim 1, wherein a feed groove (168) of the cavity of formed in the thrust face (166) and said groove (168) lies radially inward the intermediate member.

10. A receiver according to claim 1, wherein the centring surface (167) of the external body (5) serves for centring the flange (61) of the tube (6) and for centring the intermediate member (95).

11. A receiver according to claim 1, wherein the abutment shoulder (195) is formed in an axially oriented annular ring portion, which may be of divided form and which is a projecting part of the portion (153) of increased thickness.

* * * * *